Nov. 27, 1951 — R. H. SHENK — 2,576,645

SEPARATOR

Filed June 21, 1946 — 2 SHEETS—SHEET 1

INVENTOR
Robert H. Shenk.
by Florian D. Miller
ATTORNEY

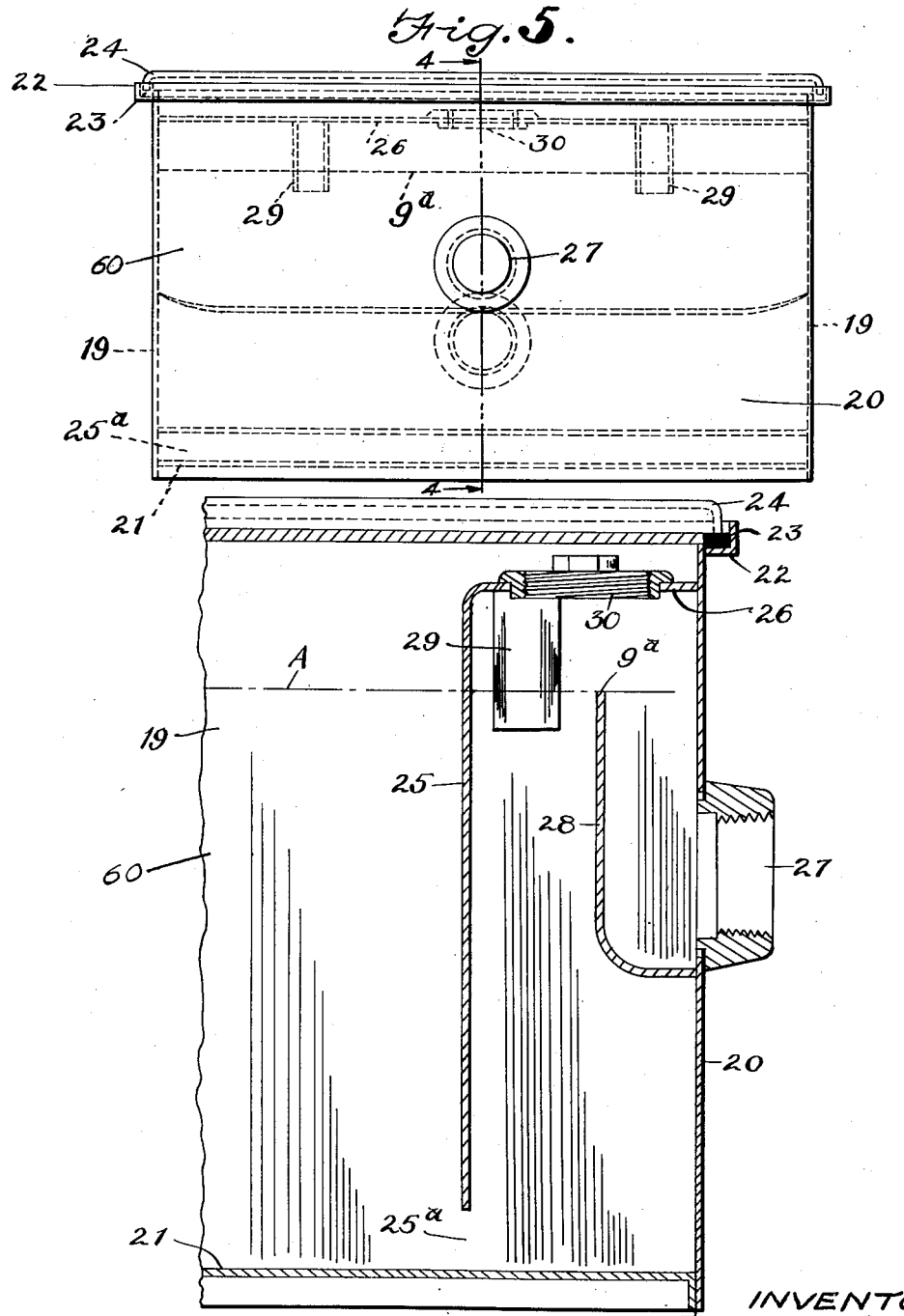

Patented Nov. 27, 1951

2,576,645

UNITED STATES PATENT OFFICE 2,576,645

SEPARATOR

Robert H. Shenk, Erie, Pa., assignor to J. A. Zurn Manufacturing Company, Erie, Pa., a corporation of Pennsylvania Application June 21, 1946, Serial No. 678,525

8 Claims. (Cl. 182—9)

This invention relates generally to separators and more particularly to separators of matter in liquid or solid form of varying densities.

All of the devices of this character, made according to the teachings of the prior art, have provided outlets in circular form which have not been adapted to permit an increased flow of liquid in a separator, due to heavy fluctuations of the fluid entering the separator, with the result that there has been considerable variation in the head of the fluid in the separator. Conventional separators have thereby permitted the escape of solid and liquid matter in flotation with the result that these separators could only be used in applications where an allowance could be made for a considerable proportion of the flotatable lighter density matter to enter the outlet of the separator. The prior separators had a very small capacity in carrying matter in flotation.

It is, accordingly, an object of my invention to overcome the above and other defects in separators, and it is more particularly an object of my invention to provide a separator for matter of varying densities which is simple in construction, economical in cost, economical in manufacture, and efficient in operation.

Another object of my invention is to provide a separator for matter of varying densities, wherein the pressure of the liquid matter is equalized and the velocity of flow of the liquid is made more uniform.

Another object of my invention is to provide a separator for matter of varying densities, in which an apertured horizontal baffle is provided for holding back large particles of solid matter.

Another object of my invention is to provide a vertical and a horizontal baffle in a separator for matter of varying densities in the form of a removable basket.

Another object of my invention is to provide a separator for matter of varying densities which maintains the fluid level in the separator within close limits under wide variations of rate of flow through the separator.

Another object of my invention is to provide a separator for matter of varying densities which utilizes the principles of floatation and gravity.

Another object of my invention is to provide a separator for matter of varying densities which permits wide variations in the height of liquid and solid matter in flotation.

Another object of my invention is to provide a horizontal weir in a separator for matter of varying densities.

Another object of my invention is to provide a separator for matter of varying densities, wherein a minimum change in efficiency of the separator is made by a change in the rate of flow of fluid, and regardless of the height of the floating solid or liquid matter.

Another object of my invention is the provision of a horizontal weir in a separator for matter of varying densities to prevent siphonage.

Another object of my invention is to provide a separator for matter having varying densities which separates one or more lighter liquids or solids from one or more heavier liquids or solids.

Another object of my invention is to provide a separator for matter of varying densities which has a horizontal weir in which the increase of the head of the liquid flowing over the weir does not increase materially on an increase in the rate of flow.

Another object of my invention is to provide a separator for matter of varying densities so arranged that a continuous outlet exists for the accommodation of the maximum flow of predominant fluid while the level in the container is maintained at practically a constant level.

Another object of my invention is to provide a trapped airvent in a separator for matter of varying densities which may be better controlled because of a minimum variation of the level of the fluid.

Other objects of my invention will become evident from the following detailed description, taken in conjunction with the accompanying drawings, in which Fig. 1 is a top plan view of a separator illustrating an embodiment of my invention;

Fig. 4 is a fragmentary sectional view taken on the line 4—4 of Fig. 5; and

Fig. 5 is an end elevational view of a modified form of my invention.

Figure 1:
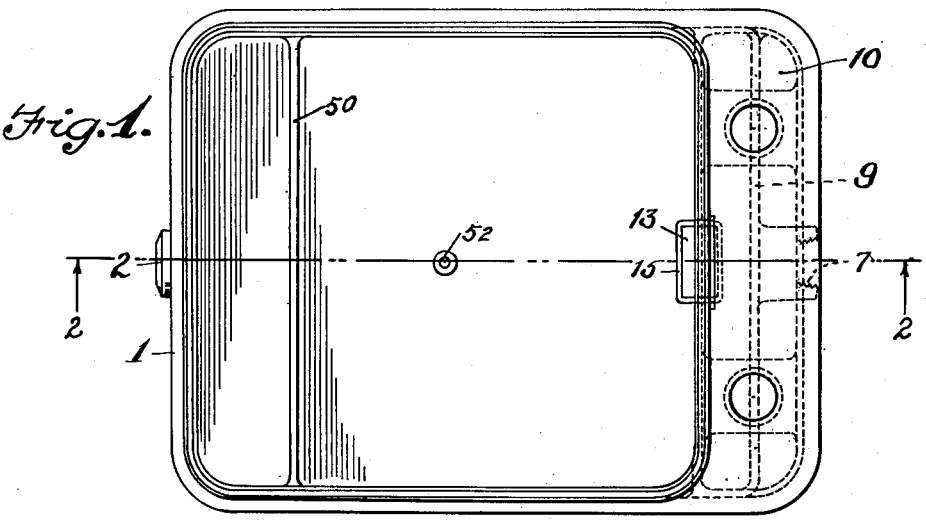
Figure 2:
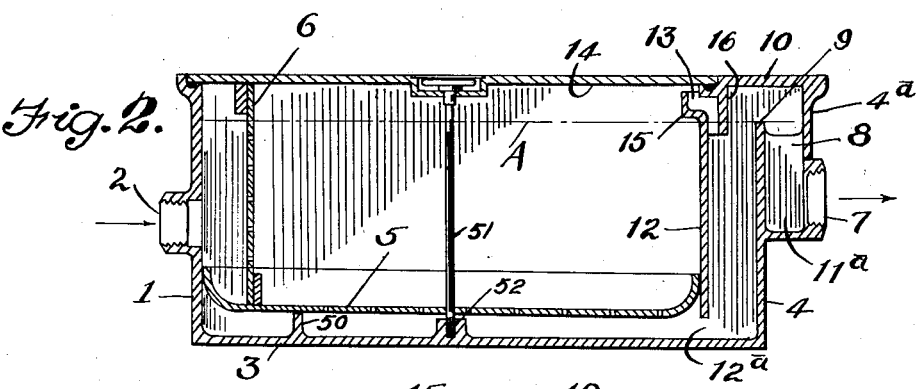
Fig. 2 is a view taken on the line 2—2 of Fig. 1.
Figure 3:
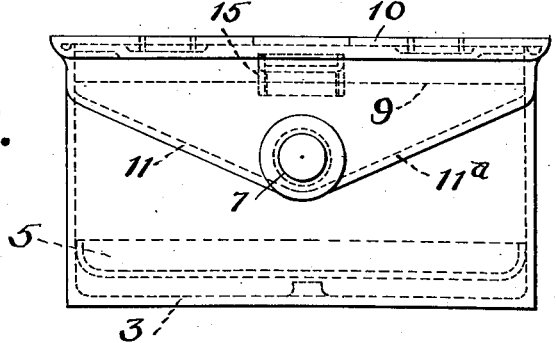
Fig. 3 is an elevational view of the outlet end of my novel separator.

Referring now to the drawings, Figs. 1, 2, and 3 show a container which has an inlet 2 and an outlet 7, and end walls 4 and 4-a.

The bottom 3 of the container 1 has an upwardly projecting rib 50 for seating an apertured horizontal baffle 5. A vertical apertured baffle 6 is disposed adjacent the inlet 1 to equalize the pressure of the fluid entering into the container and it also tends to equalize the rate of flow of fluid passing through the container 1. The baffles 5 and 6 form a removable basket. The cover 14 of the container 1 is secured to the bottom 3 of the container 1 by a threaded rod 51 which threadably engages an internally threaded boss member 52 in the bottom of container 1.

The end wall 4 is spaced from the top 10 of the container 1, wherein the upper end 9 of the wall 4 forms a weir which extends the width of the container, the width of the weir 9 being several times the diameter of the outlet 7 of the container 1. The walls 4–a, 11, 11–a, and 4 form the four sides of a spillway 8 leading from the weir 9 to the outlet 7.

The weir 9 preferably extends horizontally the entire width of the container 1, although it is not necessary that it extend the entire width of the container, so long as it is of substantially greater width than the diameter of the outlet 7. The height of the weir 9 determines the static head of the predominant liquid in the container in the first instance, and the head of liquid and solid matter in flotation in the second instance.

One of the advantages of having the weir 9 of substantially greater width than the diameter of the outlet 7 is that when liquid is discharging to the outlet 7 at the maximum rate, the overflow above weir 9 will be a comparatively thin sheet of liquid, thus assuring that the liquid level in the container 1 is maintained within very narrow limits, regardless of the variations in the rate of flow of the liquid.

Another advantage of the weir construction is that the weir prevents any condition arising whereby a siphoning action may be created, tending to empty the container, along with all solid and liquid matter in flotation. The container 1 has a depending baffle 12 spaced from the bottom 3 thereof forming a passage 12–a, leading upwardly to the weir 9 and the outlet 7. An air vent 13 is formed in the upper portion of the depending baffle 12 by means of an offset lip 15 on the baffle 12, and a depending flange 16 which extends below the top of the weir 9 a sufficient distance to provide a trap. The flange 16 depends below the weir 9 a sufficient distance to provide a seal, under normal circumstances, but provides a ready escape of gases in the container 1 under abnormal circumstances. The lip 15 extends approximately to the top cover 14 of the container 1 in order that there will be no overflow of liquid through the air vent 13.

In operation, matter in solid and fluid form from any source enters the inlet 2, and is dispersed by baffle 6, thereby equalizing the pressure of the fluid entering the inlet and tending to make the velocity of the flow of fluid passing through the container 1 more uniform. Solid particles are retained by the apertured horizontal baffle 5 and the predominant fluid passes through the passage 12–a, over the weir 9, to the spillway 8, and out through outlet 7. The fluid in the container 1 is maintained in a more or less quiescent state, permitting the flotation of less dense matter of fluid or solid form on the surface of the predominant liquid. The flow of fluid is continuous, until it reaches the level of the weir 9, as shown by the dot and dash line A. The predominant fluid maintains a level in the container within very narrow limits, regardless of the rate of flow of the fluid entering inlet 2, inasmuch as the weir 9 is of a width approximately the width of the container and increase of the head of the fluid passing thereover is small upon a multiple increase in the rate of flow. This level will be maintained, regardless of the amount of matter in liquid or solid form, floating on the surface of the level of the predominate liquid, within reasonable limits.

A modified form of my invention is shown in Figures 4 and 5. In the illustration shown in Figures 4 and 5, all parts are made of fabricated material in contrast to the casting shown in Figs. 1, 2, and 3. Container 60 comprises side walls 19 and end walls 20 and a flanged bottom wall 21. The end and side walls 19 and 20 have a marginal offset member 22 for receiving a gasket 23, utilized for seating the cover 24 to seal the container 60. At the outlet end of the container 60, shown in Fig. 4, I provide a depending baffle 25, spaced from the bottom 21 to form a passage 25–a. The upper portion of the baffle 25 is bent at right angles to form a horizontal baffle 26, extending transversely of the container 60, the horizontal baffle 26 being spaced from the top cover 24 of the container 60. Horizontal baffle 26 is attached to the end wall 20 by welding or any other suitable means. A hand hole 30 is provided in the horizontal baffle 26 for cleaning purposes. An internally threaded outlet member 27, disposed in an aperture in the wall 20, forms an outlet for container 60. An upwardly extending baffle 28 has the upper end thereof spaced from the horizontal baffle 26 to form a weir 9–a. The bottom portion of the baffle 28 is bent at right angles and secured to the end wall 20 immediately beneath the outlet member 27. The weir 9–a extends horizontally cross the entire width of the container 60 although it is only necessary that the width of the weir 9–a be substantially greater than the diameter of the outlet. Depending vent tubes 29 are disposed in the horizontal baffle 26, to permit the escape of air and gases from the container 60, the tubes 29 extending a sufficient distance below the weir 9–a, to provide a trap for air in the container 60 under normal conditions.

It will be evident that plastic or any other form of material may be used to form a container with a weir therein as herein described without departing from my invention.

It will be seen from the foregoing description that I have provided an inexpensive separator for liquid and solid matter which maintains a level of the fluid in the separator within narrow limits under all circumstances by the use of a weir, which prevents siphoning action through the outlet, and which provides a means for permitting the predominant fluid in a separator to discharge under any circumstances.

I have further provided a separator which permits a greater amount of fluid and solid matter in flotation because there is a minimum of change of level of the predominant fluid in the container.

Various changes may be made in the specific embodiment of my invention without departing from the spirit thereof or from the scope of the appended claims.

What I claim is:

1. A separator for matter of varying densities, comprising a container having an inlet and an outlet, a weir formed in the outlet end of said container extending above said inlet, and a spillway formed in the outlet end of said container leading to said outlet, and a baffle depending from the top side of said container to form a passage for fluid over said weir to said outlet.

2. A separator for matter of varying densities comprising a container having an inlet and an outlet, a vertical apertured baffle adjacent said inlet, an apertured horizontal baffle, a depending baffle spaced from the bottom of said container and a baffle spaced from the top of said container adjacent said outlet forming a horizontal weir.

3. A separator as set forth in claim 2 wherein said apertured vertical and horizontal baffles form a removable basket.

4. A separator as set forth in claim 2 wherein a trapped air vent is provided in said baffle depending from the top of said container.

5. A separator for matter of varying densities comprising a fabricated container, having an inlet and an outlet end, said outlet end having an outlet aperture, a substantially right angled depending baffle secured to said outlet end above said outlet aperture, and a substantially right angled upwardly extending baffle secured to said outlet end below said aperture, the upper end of said upwardly extending baffle forming a weir.

6. A separator for matter of varying densities comprising a rectangular shaped container having an inlet in one end and an outlet in the opposite end thereof, a baffle in the outlet end of said rectangular shaped container rigidly attached to the side walls thereof and spaced from the outlet end of said container, the horizontal top portion of said baffle defining a horizontal weir extending above said inlet and said outlet and across the entire width of said container, and a downwardly converging spillway leading from said weir to said outlet.

7. A separator for matter of varying densities comprising a container having an inlet in one end thereof and an outlet in the opposite end thereof and a top and a bottom, apertured vertical and horizontal baffles in said container defining a removable basket, a transverse baffle in said container intermediate said inlet and outlet and spaced from the bottom thereof defining a separating chamber between the inlet end of said container and said baffle wherein said apertured baffles are disposed, a transverse baffle intermediate said first mentioned baffle and the outlet end of said container spaced from the top of said container defining a weir disposed above said inlet and said outlet of said container and extending across the entire width of said container, said transverse baffles defining an upwardly extending passageway therebetween for fluid, and a spillway leading from said weir downwardly to said outlet.

8. A separator for matter of varying densities as set forth in claim 5 wherein said depending baffle has a horizontal portion rigidly attached to said end wall and a depending vertical portion spaced a substantial distance from said wall, the horizontal portion of said depending baffle having an apertured portion with a depending tubular member extending below the top of said horizontal weir to define an air vent.

ROBERT H. SHENK.

REFERENCES CITED

The following references are of record in the file of this patent:

UNITED STATES PATENTS

| Number | Name | Date |
| --- | --- | --- |
| 723,618 | Newton | Mar. 24, 1903 |
| 1,121,270 | McDermott | Dec. 15, 1914 |
| 2,057,203 | Payzer et al. | Oct. 13, 1936 |
| 2,059,844 | Boosey | Nov. 3, 1936 |
| 2,383,436 | Arndt | Aug. 28, 1945 |
| 2,433,087 | Boosey | Dec. 23, 1947 |

FOREIGN PATENTS

| Number | Country | Date |
| --- | --- | --- |
| 557,885 | Great Britain | Dec. 9, 1943 |